United States Patent [19]
Ayliffe, Jr. et al.

[11] Patent Number: 5,233,941
[45] Date of Patent: Aug. 10, 1993

[54] ANIMAL FEEDER

[76] Inventors: Richard Ayliffe, Jr., 11477 Whitaker Rd.; Stewart Grove, Jr., 11433 Whitaker Rd., both of Fenton, Mich. 48430

[21] Appl. No.: 904,497

[22] Filed: Jun. 25, 1992

[51] Int. Cl.$^5$ ............................................. A01K 5/00
[52] U.S. Cl. .................................................. 119/57.91
[58] Field of Search ............... 119/57.91, 51.04, 51.03, 119/52.1, 53, 53.5, 54, 55

[56] References Cited

U.S. PATENT DOCUMENTS

| | | | |
|---|---|---|---|
| 570,569 | 11/1896 | Smith | 119/53 |
| 594,785 | 11/1897 | Fouzer | 119/53 |
| 846,175 | 3/1907 | Xevers | 119/53 |
| 1,427,021 | 8/1922 | Rudolph | 119/53 |
| 2,808,029 | 10/1957 | Geerlings | 119/53 |
| 3,648,661 | 3/1972 | Moore | 119/53 |

*Primary Examiner*—Gene Mancene
*Assistant Examiner*—Thomas Price
*Attorney, Agent, or Firm*—Gifford, Groh, Sprinkle, Patmore and Anderson

[57] ABSTRACT

An animal feeder is disclosed for use with a ground surface. The animal feeder includes a container which defines a chamber adapted to contain granular animal feed. A plurality of legs support the container in an elevated position above the ground surface. An elongated tube open at each end is secured to the container so that the open upper end of the tube is open to the chamber and thus to the animal feed contained therein. The tube extends generally vertically downwardly so that the bottom of the tube is open to the ground surface. Moreover, the tube is dimensioned so that its lower end is spaced upwardly from the ground surface by a distance such that animal feed from the chamber flows downwardly from the chamber in a controlled fashion and forms a pile on the ground beneath the tube and around the lower end of the tube. Thus, the pile blocks the further flow of animal feed through the tube until a portion of the animal feed on the ground surface is eaten or otherwise removed.

11 Claims, 1 Drawing Sheet

ANIMAL FEEDER

BACKGROUND OF THE INVENTION

I. Field of the Invention

The present invention relates generally to animal feeders.

II. Description of the Prior Art

There are a number of previously known animal feeders, such as bird feeders, for feeding wild game. Most of these previously known feeders are designed for feeding small game, rather than larger game.

A still further disadvantage of these previously known animal feeders is that they are relatively expensive in construction and yet hold only a relatively small amount of animal feed. Such small amounts of animal feed are unsatisfactory for large wild game, such as deer, since such game rapidly eat and deplete the food from the feeder.

SUMMARY OF THE PRESENT INVENTION

The present invention provides an animal feeder which overcomes all of the above-mentioned disadvantages of the previously-known devices.

In brief, the animal feeder of the present invention comprises a container defining an interior chamber which is designed to contain granular animal feed. The container is relatively large in size, for example, the size of a conventional garbage can.

The container is supported in an elevated position above the ground surface. Preferably, a plurality of legs are secured to and extend downwardly from the container so that the legs engage the ground surface and support the container in the elevated position above the ground.

An elongated tube open at each end has its upper end secured to the container so that the open upper end of the tube is open to the container chamber and thus to the animal feed contained within the chamber. The tube extends generally vertically from the container towards the ground surface. Furthermore, the tube is dimensioned so that its lower end is positioned upwardly from the ground surface by a distance such that the animal feed from the chamber flows downwardly through the tube in a controlled fashion and forms a pile on the ground beneath the tube and around the lower end of the tube. Thus, the pile blocks the further flow of animal feed through the tube until a portion of the animal feed on the ground surface is eaten or otherwise removed.

BRIEF DESCRIPTION OF THE DRAWINGS

A better understanding of the present invention will be had upon reference to the following detailed description when read in conjunction with the accompanying drawings, wherein like reference characters refer to like parts throughout the several views, and in which.

DETAILED DESCRIPTION OF THE PREFERRED EMBODIMENTS OF THE PRESENT INVENTION

Figure 1:
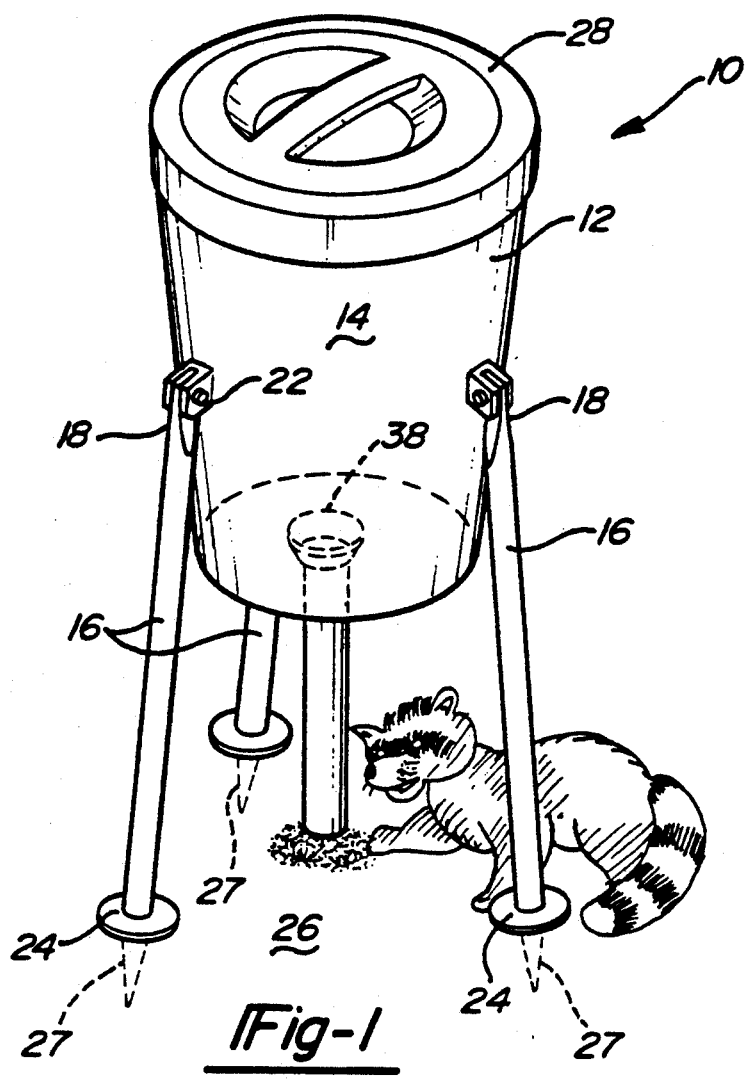
FIG. 1 is an elevational view illustrating a preferred embodiment of the present invention.

With reference first to FIG. 1, a preferred embodiment of the animal feeder 10 of the present invention is thereshown and comprises a container 12 defining an interior chamber 14 adapted to contain granular animal feed. Preferably, the container 12 is relatively large in size, for example the size of a conventional thirty-gallon garbage can.

At lest three elongated legs 16 have their upper ends 18 secured to the container 12 in any conventional fashion. As is illustrated in FIG. 1, however, the upper ends 18 of the legs 16 are secured by pivot bolts 22 to the container 12. The pivot bolts 22 thus allow the legs to pivot against the container, as illustrated in FIG. 1, for installation.

The lower ends 24 of the legs 16 engage a ground support surface 26 and thus support the container 12 in an elevated position above the ground support surface 26. The lower ends 24 of the legs 16, furthermore, may contain spikes 27 which embed in the ground support surface 26 for increased stability of the feeder 10.

A lid 28 is removably positioned across the top of the container 12. After the container 12 has been filled with animal feed, the lid 28, when positioned across the top of the container 12, prevents animals from eating from the top of the container 12 and keeps granular feed protected from the elements to promote flow.

Figure 2:
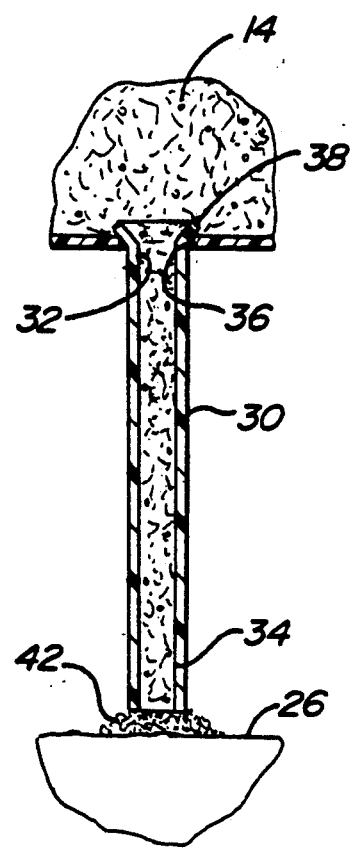
FIG. 2 is a fragmentary sectional view illustrating a portion of the preferred embodiment of the present invention.

With reference now to FIGS. 1 and 2, the animal feeder 10 further comprises an elongated tube 30 open at its upper end 32 and lower end 34. The tube 30, which is preferably constructed of plastic for inexpensive construction, has its upper end positioned through an opening 36 in the bottom of the container 12 so that the top 32 of the tube 30 is open to the animal feed contained within the container chamber 14. Preferably, a funnel 39 is secured to the upper end 32 of the tuber 30 which not only secures the tube 30 to the container 12, but also serves to channel the animal feed into the tube 30 and allows tube movement for additional feed dispersement.

As best shown in FIG. 2, the tube 30 extends generally vertically downwardly from the container 12 so that is lower end 34 is spaced upwardly from the ground surface 26. Additionally, the tube is dimensioned so that animal feed from the chamber 14 flows downwardly from the chamber 14 in a controlled fashion and forms a pile 42 of animal feed on the ground beneath the tube 30. Additionally, this pile 42 extends around the lower end 34 of the tube 30 whereupon the pile 42 blocks the further flow of animal feed through the tube 30 until a portion of the pile 42 is eaten or otherwise removed and also if an animal moves the tube. Once the pile 42 is eaten or otherwise removed, or if an animal moves the tube enough, animal feed again flows from the chamber 14 in a controlled fashion thus reforming the pile 42 and dispensing the animal feed in the desired fashion.

Figure 3:
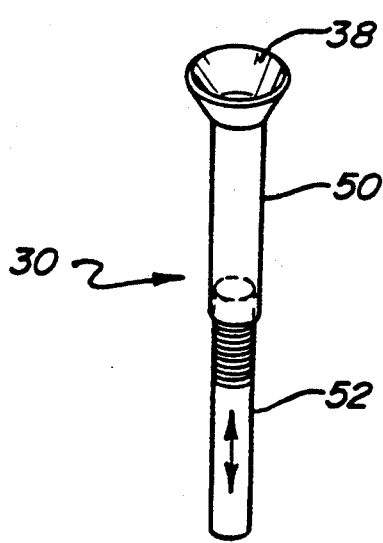
FIG. 3 is an elevational view illustrating a modification of one component of the preferred embodiment of the present invention.

With reference now to FIG. 3, a modification of the present invention is threshown in which the tube 30 comprises a first tube segment 50 and a second tube segment 52. The second tube segment 52 is telescopically or threadably received within the first tube segment 50 thereby adjusting the longitudinal length of the tube 30. Such adjustment would be desirable, for example, for uneven ground terrain and different types of animal feed.

From the foregoing, it can be seen that the present invention provides a simple, inexpensive yet totally effective animal feeder. Having described out invention, however, many modifications thereto will become apparent to those skilled in the art to which it pertains without deviation from the spirit of the invention as defined by the scope of the appended claims.

I claim:

1. An animal feeder for use with a ground surface comprising:

a container defining a chamber adapted to contain granular animal feed, means for supporting said container in a elevated position above the ground surface, an elongated tube open at each end, means for securing said tube to said container so that an upper end of said tube is open to said chamber and so that said tube extends substantially vertically, wherein said tube is dimensioned so that a lower end of said tube is positioned upwardly from said ground surface by a distance such that animal feed from said chamber flows downwardly from said chamber in a controlled fashion and forms a pile on the ground beneath the tube and around the lower end of said tube whereupon the pile blocks the further flow of animal feed through said tube until a portion of the animal feed on the ground surface is removed, wherein said means for securing said tube to said container comprises a trough positioned in said container chamber, said tube being secured to a midpoint of said trough so that said trough channels animal feed to said tube, said trough having a funnel shape.

2. The invention as defined in claim 1 wherein said supporting means comprises a plurality of elongated legs secured to and extending downwardly from said container.

3. The invention as defined in claim 2 wherein said plurality of legs comprises three legs.

4. The invention as defined in claim 3 and comprising means for pivotally securing said legs to said container.

5. The invention as defined in claim 1 wherein at least one leg has a ground engaging spike at its lower end.

6. The invention as defined in claim 1 and comprising a lid for said container.

7. The invention as defined in claim 1 wherein said supporting means support said container above the ground surface by at least four feet.

8. The invention as defined in claim 1 wherein said tube is constructed of plastic.

9. The invention as defined in claim 1 wherein said container is cylindrical in shape.

10. The invention as defined in claim 1 wherein said tube comprises means for adjusting the length of said tube.

11. The invention as defined in claim 10 wherein said adjusting means comprises a first tube segment and a second tube segment, said second tube segment being telescopically received in said first tube segment.

* * * * *